United States Patent
Herzog et al.

(10) Patent No.: US 8,200,013 B2
(45) Date of Patent: Jun. 12, 2012

(54) METHOD AND DEVICE FOR SEGMENTING A DIGITAL CELL IMAGE

(75) Inventors: Otthein Herzog, Bremen (DE); Peter Friedl, Würzburg (DE); Björn Gottfried, Bremen (DE)

(73) Assignee: Universitat Bremen, Bremen (DE)

( * ) Notice: Subject to any disclaimer, the term of this patent is extended or adjusted under 35 U.S.C. 154(b) by 9 days.

(21) Appl. No.: 13/211,751

(22) Filed: Aug. 17, 2011

(65) Prior Publication Data

US 2011/0299756 A1 Dec. 8, 2011

Related U.S. Application Data

(62) Division of application No. 11/570,341, filed as application No. PCT/EP2005/006231 on Jun. 10, 2005, now Pat. No. 8,019,156.

(30) Foreign Application Priority Data

Jun. 11, 2004 (DE) .......................... 10 2004 028 372

(51) Int. Cl.
*G06K 9/00* (2006.01)
*G06K 9/34* (2006.01)
*G06K 9/38* (2006.01)

(52) U.S. Cl. ......... 382/173; 382/168; 382/171; 382/172

(58) Field of Classification Search ................. 382/168, 382/171, 172, 173
See application file for complete search history.

(56) References Cited

U.S. PATENT DOCUMENTS

| | | | |
|---|---|---|---|
| 5,020,124 A | 5/1991 | D'Aoust et al. | |
| 5,029,226 A | 7/1991 | Klein et al. | |
| 5,093,871 A | 3/1992 | Klein et al. | |
| 5,140,444 A | 8/1992 | Klein et al. | |
| 5,305,398 A | 4/1994 | Klein et al. | |
| 5,668,888 A | 9/1997 | Doi et al. | |
| 7,391,895 B2 | 6/2008 | Wang et al. | |
| 2005/0018893 A1 | 1/2005 | Wang et al. | |

OTHER PUBLICATIONS

Borst, Hugo; Abmayr Wolfgang Und Gais, Peter: "A Thresholding Method for Automatic Cell Image Segmentation", The Journal of Histochemistry and Cytochemistry, 'Online!, vol. 27, No. 1, 1979, pp. 180-187, XP002348409 USA, Retrieved from the Internet: URL: www.jhc.org/cgi/reprint/27/1/180>'retrieved on Oct. 10, 2005.

Yanowitz, S. D.; Bruckstein, A.M. : "A New Method for Image Segmentation" Proceedings of the International Conference on Pattern Recognition. (ICPR). Rome, Nov. 14-17, 1988, Washington, IEEE, Comp. Soc. Press, US vol. 1, conf. 9, Nov. 14, 1988, pp. 270-275, XP000112659 , ISBN: 0-8186-0878-1.

Ong, S. H. et al: "Image Analysis of Tissue Sections", Computers in Biology and Medicine, New York, NY, US, vol. 26, No. 3, May 1996, pp. 269-279, XP004532242 , ISSN: 0010-4825.

*Primary Examiner* — Bernard Krasnic

(74) *Attorney, Agent, or Firm* — Gottlieb, Rackman & Reisman, P.C.

(57) ABSTRACT

A method and a device for segmenting a digital image of biological cells, a method and a device for analyzing the dynamic behavior of biological cells and a method and a device for visualizing the dynamic behavior of biological cells. To provide a segmentation method that has minimal technical requirements, does not necessitate any special preparation or manipulation of the cells to be observed and which requires as few assumptions as possible to be made about the properties of the cells, it is proposed that the method comprises the following steps: determining a maximum gradient for each pixel of the image as the maximum difference between a pixel value of the pixel and the respective pixel values of all or selected neighboring pixels, determining a segmentation threshold value using the maximum gradients, classifying the images into an object class and an environment class using the segmentation threshold value and forming a segmentation zone of the digital image using a class merging method, in particular a region growing method.

7 Claims, 9 Drawing Sheets

  
Fig. 7a    Fig. 7b    Fig. 7c
 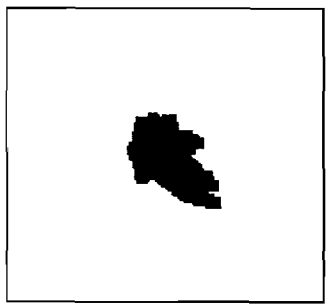
Fig. 7d    Fig. 7e
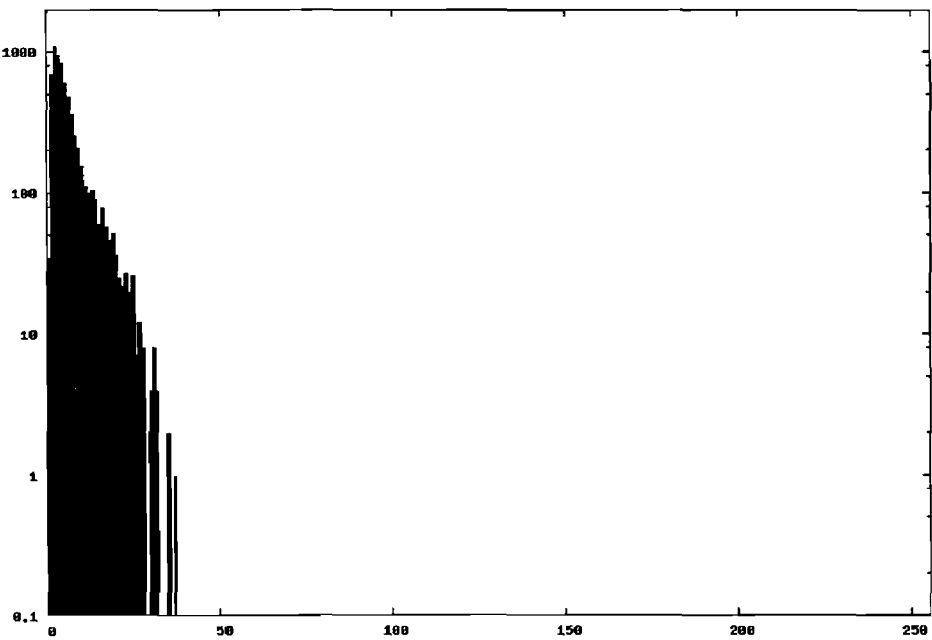
Fig. 7f

METHOD AND DEVICE FOR SEGMENTING A DIGITAL CELL IMAGE

CROSS-REFERENCE TO RELATED APPLICATIONS

This application is a Division of Application Ser. No. 11/570,341, filed Mar. 1, 2007, now U.S. Pat. No. 8,019,156 which is a National Stage Entry of PCT/EP05/06231 dated Jun. 10, 2005 which claims priority to GERMAN 10 2004 028 372.9 dated Jun. 11, 2004, the contents of which are incorporated herein by reference.

BACKGROUND OF THE INVENTION

The invention relates to a method and a device for segmenting a digital image of biological cells, a method and a device for analyzing the dynamic behavior of biological cells and a method and a device for visualizing the dynamic behavior of biological cells.

Measuring the movement of biological cells is used as a screening method in the search for pharmacological agents, for example in tumor and immunology research, thus providing an in-vitro alternative to animal experiments.

In one known method, the cells are dyed with fluorescent dyes using suitable techniques to make it easier to distinguish between the cells and the background or environment. The disadvantage of this technique is that the physiology of the cells may be affected by the dye, particularly the mobility and motion of the cells, meaning properties that are to be studied. The known method is essentially limited to a two-dimensional sample, such as a cell lawn, for example, because preparing three-dimensional samples would be very complex. Furthermore, adding the third dimension is very complex in terms of the technical equipment required, in that an automatic motorized microscope is needed and large amounts of data are generated that make routine applications difficult. In the case of long-term experiments, especially, problems result from the fact that the fluorescent effect changes over time due to decomposition or deposition in certain cellular components. If a tagged cell divides during observation, it is not possible to ensure that the tag is passed on equally to both daughter cells.

Conventional methods for cell tracking make assumptions about cell properties, such as their shape or size, which are assumed to be constant. However, these assumptions cannot be maintained for all cell types, and especially not for mobile cells. In addition, these methods are either very complex with regard to the hardware or computing power required and/or are very sensitive to any blurred demarcations between the cell and its environment. Especially in three-dimensional samples of cells in a heterogeneous collagen matrix, these demarcations are not present to a sufficient extent.

The object of the invention is to specify a method for segmenting a digital image of biological cells that involves minimal technical requirements, does not necessitate any special preparation or manipulation of the cells to be observed and which requires as few assumptions as possible to be made about the properties of the cells.

BRIEF SUMMARY OF THE INVENTION

This object is accomplished by a method for segmenting a digital image of biological cells, said method comprising the following steps:
determining a maximum gradient for each pixel of the image as the maximum difference between a pixel value of the pixel and the respective pixel values of all or selected neighboring pixels,
determining a segmentation threshold value using the frequencies of the maximum gradients, comprising the steps
a) assigning a gradient frequency to all maximum gradients as the number of pixels having the respective maximum gradient,
b) determining the value of an environment variable as the number of pixels for which the most frequent maximum gradient was determined,
c) iteratively comparing the value of the environment variable and a predefined estimate for the number of pixels depicting the environment of a biological cell, and adding the number of pixels having the next most frequent maximum gradient to the value of the environment variable until the value of the environment variable exceeds or reaches the estimated value, and
d) determining the segmentation threshold from the number of repetitions of step c).
classifying the pixels into an object class and an environment class using the segmentation threshold value, those pixels whose maximum gradient is equal to or greater than the segmentation threshold value being allocated to the object class and the other pixels being allocated to the environment class, and
forming a segmentation zone of the digital image using a class merging method, in particular a region growing method.

The invention is based on the realization that segmentation can be performed in a simple manner, largely independently of cell properties and with insensitivity to low image quality, using changes in pixel values among pixels. For this invention, the main property of the pixels of an image to be segmented is the degree to which a pixel differs from its surrounding pixels. The number of occurrences is determined for each maximum gradient, i.e. the number of pixels with the respective maximum gradient. Proceeding from the most frequently occurring maximum gradient, other, less frequent maximum gradients are added in and each total number of pixels is determined whose maximum gradient belongs to those selected until a predetermined estimated value for the environment of the cell, expressed as a number of pixels, is reached or exceeded. This results in a segmentation threshold value depending on the number of iternations required until the estimated number is reached or exceeded, i.e. depending on how many of the most frequent maximum gradients had to be combined, as a delimitation between pixels for which it is initially assumed that they form the cell, and other pixels for which it is assumed that they form the cell environment.

By successively adding in the maximum gradients of decreasing frequency until more pixels are recorded than is defined by an estimate for the value of the environment variable resulting from the difference between the size of the image and an estimate for the cell size, an increasing threshold value dependent on the number of iterations is obtained. This threshold value can be selected to be equal to the number of iterations. Another option is to specify the threshold value as being a predetermined value greater or smaller than the number of iterations, in other words to provide an absolute difference between the number of iterations and the threshold value. Another option is to multiply the number of iterations by a predetermined factor (greater or smaller than 1) and hence to obtain a relative deviation between the number of iterations and the threshold value. These options can also be combined.

In one embodiment of the invention, the segmentation threshold value is determined to be the number of repetitions of step c). It has been found that the best segmentation results can generally be obtained when this choice is made. However, in special cases and when there are special imaging constellations, better results can be achieved with a modified threshold value. In another embodiment of the invention, the segmentation threshold value is determined by multiplying the number of repetitions by a predetermined factor, particularly in a range from 0.5 to 1.5, preferably in a range from 0.66 to 1.33, and particularly preferably in a range from 0.8 to 1.2, and/or by adding a predetermined constant, specifically in a range from −10 to +10, and preferably in a range from −5 to +5, to the number of repetitions. It must be noted that the predetermined constant can also be less than zero.

Subdividing the image on the basis of the segmentation threshold value produces two groups of pixels. Smaller zones of pixels erroneously assigned to the cell environment group are found in the cell zone, and vice versa. By means of a class-merging method known from image processing, e.g. a region growing method, the group of pixels assigned to the cell is combined to form a contiguous zone. With this method, isolated smaller zones of pixels or single pixels can be dropped, i.e. are counted among the group of pixels assigned to the cell environment. Corresponding results are obtained when the class merging method is applied to the group of pixels assigned to the cell environment.

Since it not any absolute properties of the pixels, but the change in these properties relative to neighboring pixels that forms the basis for the method according to the invention, the method is insensitive to fluctuating image parameters such as luminosity or contrast. This reduces the technical effort required and expands the potential range of applications. Since no modifications have to be made to the cells, for example by preparation techniques such as dyeing, the results of observation are not falsified if such changes are made.

In one preferred embodiment of the invention, the pixel value being analyzed is the gray-scale value of the pixel. Although other pixel values of a pixel can be used, such as its color characteristics, the gray-scale value has the comparative advantage of making lower demands in respect of the image recording equipment and storage capacity. A resolution of 256 gray-scale values is already sufficient.

In another embodiment of the invention, the pixels of a 4- or 8-neighborhood around the pixel are selected. The 8-neighborhood includes the pixels that are immediately adjacent the pixel to be examined, whereas the 4-neighborhood includes only each alternate one of these 8 surrounding pixels. If the gradients are extracted uniformly in every direction within the plane in order to determine the maximum gradient, there is no imbalance in a particular direction that could lead to segmentation becoming distorted.

In one advantageous embodiment of the invention, the predefined estimate is determined from the difference between image size and the product of the average cross-sectional area of a cell and the resolution of the digital image. This estimate is based on the assumption that the cell itself approximately retains its size even when it changes its shape. No other assumptions are made which require special knowledge of the cells to be studied, or which limit the number of cells that can be studied.

The invention also relates to a method for analyzing the dynamic behavior of biological cells using an image data set for a plurality of consecutively produced images of the cells in a zone being examined, said method comprising the steps:
segmenting a first image to determine first cell positions in the first image,
segmenting a second image to determine second cell positions in the second image,
correlating the second cell positions with the first cell positions,
segmentation being performed in accordance with the inventive method described above. The dynamic behavior of the individual cell is analyzed by defining segmentation zones, in the consecutive images, corresponding to the imaged cells, and by correlating these segmentation zones with each other. In addition to motion, dynamic behavior can also include cell divisions or changes in the shape of the cell or cells. Generally speaking, dynamic behavior is understood to include any changes in cell characteristics.

In one preferred embodiment of the analytical method according to the invention, the predetermined estimate for segmenting the second image is determined from the average number of pixels of the segmentation zones depicting the cells in the first image. This improved estimate is closer to the actual size than the estimate referred to further above, because the recognized sizes of the cells in the first image are used here to define the estimated value. If there is only one single cell in the first image, which may also be a section of a larger image, then the estimate is obtained as the size or pixel quantity of that cell, and it is assumed that the size of the cell does not change significantly between the first and second image. The estimate will therefore be a good approximation to the size of the cell environment in the second image.

In one advantageous embodiment of the analytical method according to the invention, the second cell positions are correlated with the first cell positions on the basis of at least one cell property from the group of total luminosity, proximity, size and shape. It is particularly preferred that proximity be used as the property, because the time difference between two images can be set in such a way that the cell has not moved out the immediate vicinity of its position in the first image by the time the second image is made. If, in the second image, the user selects only a section around the position of a cell in the first image, then the computing power or time required for segmentation can be additionally reduced. If the proximity criterion is not sufficient for deciding, then additional properties can be used to ensure reliable correlation.

The invention also relates to a method for visualizing the dynamic behavior of biological cells using an image data set for a plurality of consecutively produced images of the cells in a zone being examined, said method comprising the steps:
recording a temporal sequence of digital images,
segmenting a starting image,
selecting one or more cells to be examined,
analyzing the dynamic behavior of the cells to be examined and
processing the information obtained from the analysis,
wherein segmentation is performed in accordance with the segmentation method described above, and/or the analysis of dynamic behavior is performed in accordance with the analytical method described above. In the first image of the temporal sequence of images, segmentation is followed by selection of the cell(s) to be analyzed. Starting positions are thus specified for the subsequent automatic analysis of the dynamic behavior of the cell or cells.

In one advantageous embodiment of the visualization method according to the invention, the second cell positions are correlated with the first cell positions based on a direction of movement and/or speed associated with a cell position. Proceeding, from a starting or first image, and after the correlation of cell positions with the second image, a direction and speed for this correlation is obtained that can then be used to improve the correlation of cell positions with a third image.

This correlation is largely independent of disruptions caused by changes in cell size, cell shape or sharpness of the image.

The invention also provides devices for performing the inventive method, and a computer program comprising computer program code for controlling a computer in order to perform the steps of a method according to the invention when the computer program is executed on a computer.

BRIEF DESCRIPTION OF THE DRAWINGS

The invention shall now be described in detail with reference to advantageous embodiments and the Figures, in which:

FIG. 7a shows another example of a cell image, FIG. 7b shows the image from FIG. 7a after pre-processing, FIG. 7c shows a gradient image of the image in FIG. 7b, FIG. 7d shows the gradient image from FIG. 7c in binarized from after applying the threshold value determined according to the invention, FIG. 7e shows an image of the segmented cell after applying class merging, FIG. 7f shows a gradient histogram with the frequencies of the maximum gradients from FIG. 7d.

DETAILED DESCRIPTION OF THE INVENTION

Figure 1:
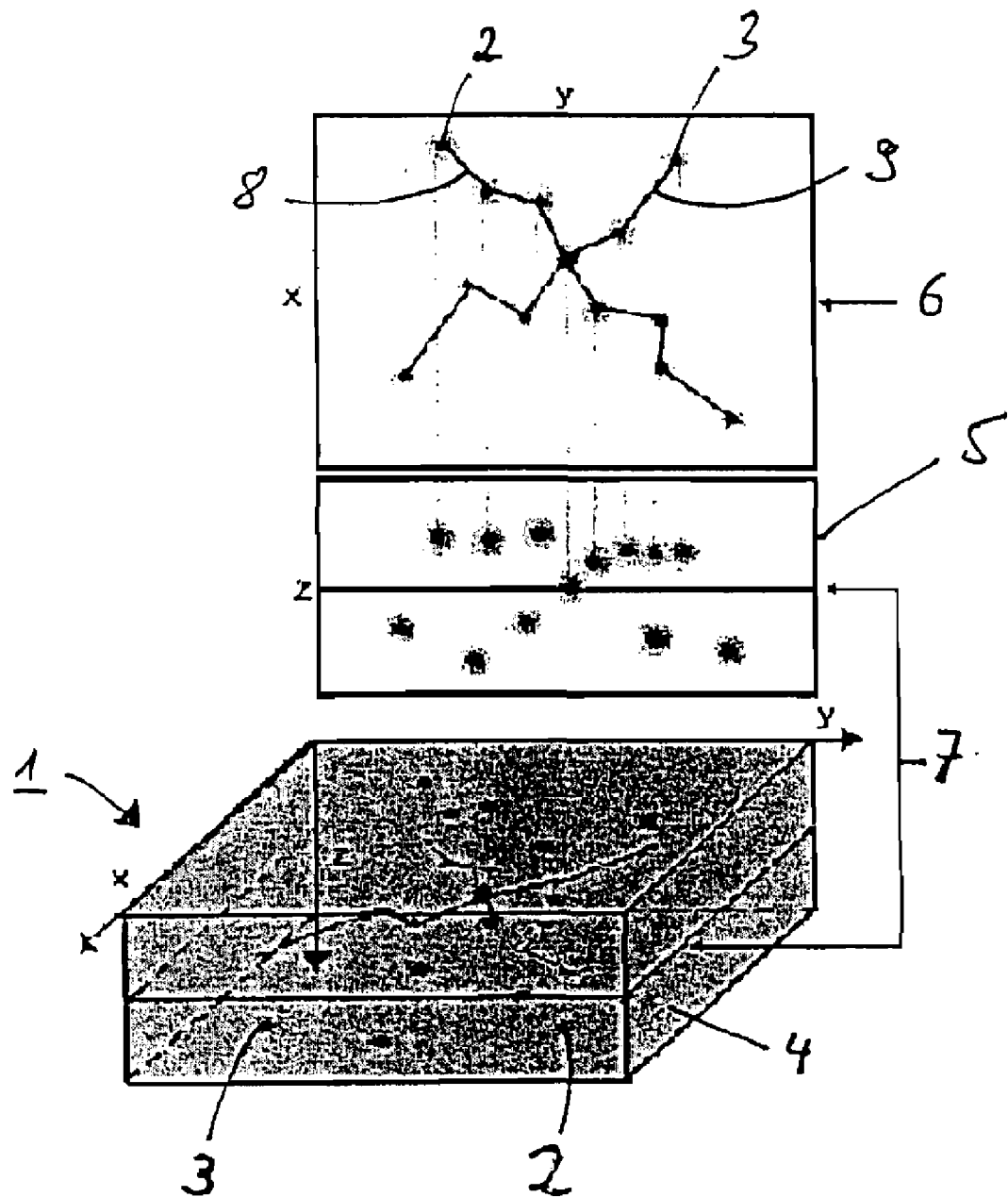
FIG. 1 shows a schematic perspective view of cells in a collagen matrix with a cross-section and a plan view.

FIG. 1 shows a schematic perspective view 1 of cells 2, 3 in a collagen matrix 4 with a cross-section 5, and a plan view 6. When an image is made of collagen matrix 4 containing cells 2, 3, it is necessary to focus on a plane 7. When cells 2, 3 move, as shown here by paths 8, 9, they are located not only at different x-y-positions, but can likewise change their z-position. The positions of cells 2, 3 at different times are marked by points in FIG. 1. Plan view 6 can be recorded at time intervals, for example, and the images thus obtained can be used to visualize the cell movement. It is equally possible to examine the dynamic behavior of the cells on the basis of other properties such as cell shape or cell size.

Figure 2:
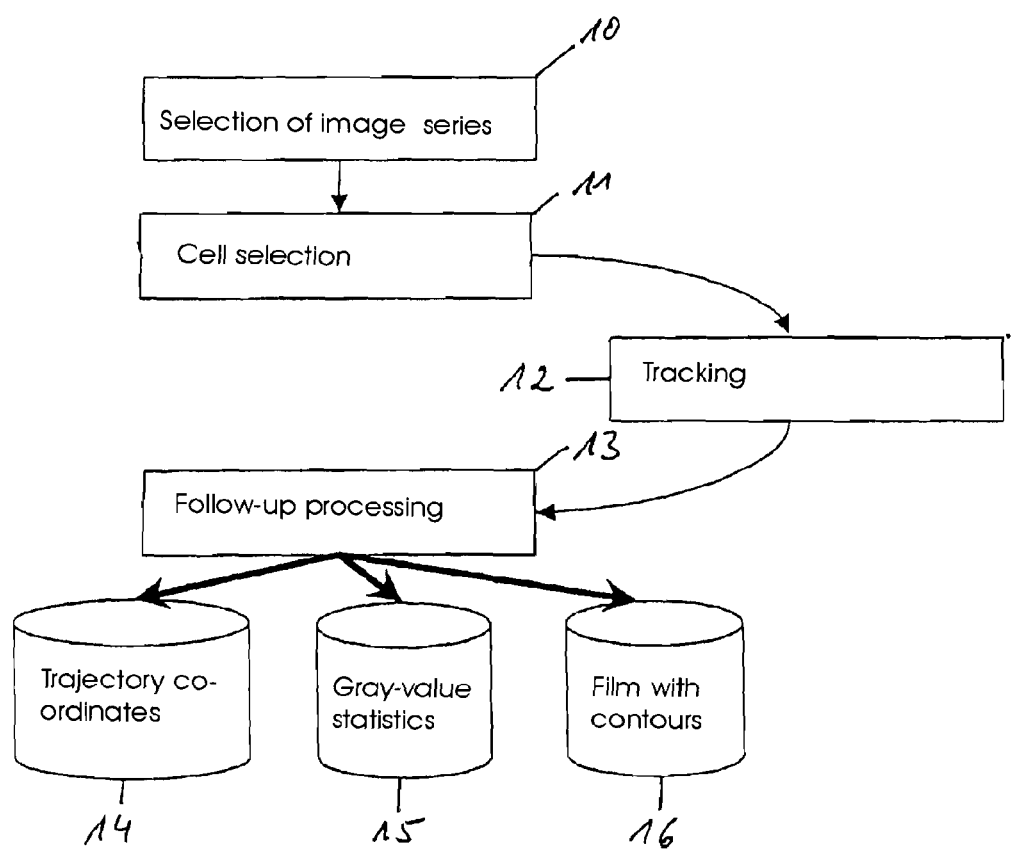
FIG. 2 is a block diagram showing the method according to the invention for visualizing the dynamic behavior of biological cells.

FIG. 2 shows a block diagram illustrating the method of the invention for visualizing the dynamic behavior, in particular the movement of biological cells. In a first step 10, a series of pictures is selected from the sequence of consecutive images available. In the following cell selection step 11, cell positions in the first image are selected. The cells associated with these cell positions are tracked in tracking step 12 and their movement is analyzed. In follow-up processing 13, the information acquired during tracking 12 is checked, subjected to follow-up processing and reprocessing if necessary, and can then be outputted as trajectory co-ordinates 14, i.e. as movement information, as gray-scale value statistics 15, i.e. as information about the properties of the cells, or as a film with cell contours 16, in particular for checking the quality of cell tracking. Steps 10, 11 and 13 are performed interactively with a user, whereas tracking 12 is performed automatically. Once recorded, the images are available in the computer; the method can therefore be used not only offline but also online.

Figure 3:
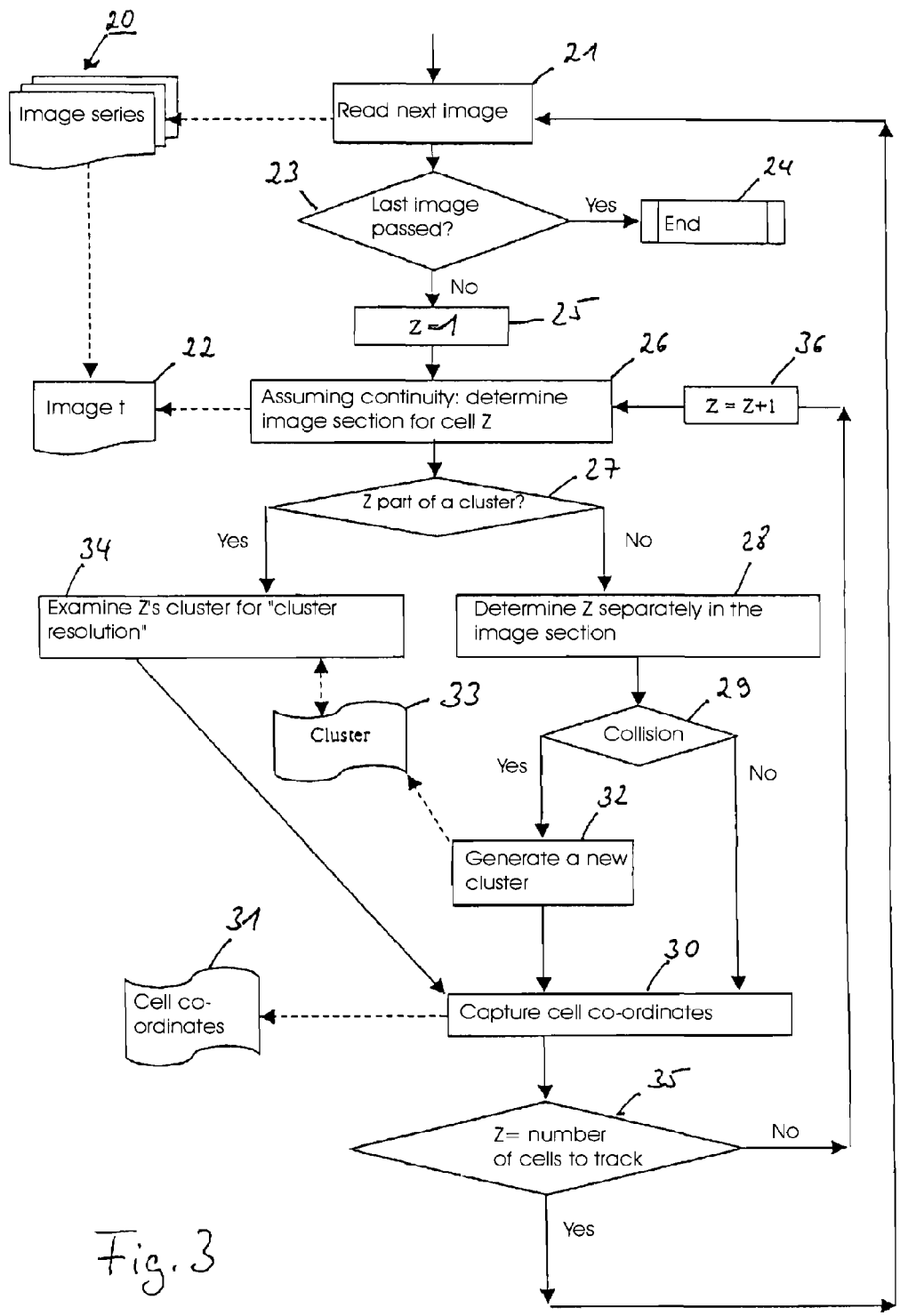
FIG. 3 shows a flow chart of part of the method according to the invention for visualizing the dynamic behavior of biological cells.

FIG. 3 shows a flow chart of step 12 in FIG. 2, namely the tracking step. In step 21, an image 22 is selected from a series of images 20, the selected image 22 being either the first image when starting tracking 12, and in subsequent steps the following image. If a check 23 reveals that the final picture of the series 20 has been processed, the end 24 of tracking 12 has been reached. Otherwise, a counter Z is initialized (step 25) and definition 26 of an image section from image 12 is performed for the cell corresponding to the value of Z, under the assumption of continuity. The assumption of continuity means assuming that the respective cell has not distanced itself significantly from its position in the previous picture.

If a check 27 reveals that the cell at Z is not part of a cluster, i.e. of an aggregation of cells that cannot be distinguished from each other on account of their position, the position of the cell is defined in the image section (step 28) and a check 29 is performed to determine whether the cell has collided with another cell. A collision in this sense corresponds to an overlapping of cell boundaries that are no longer visually distinguishable, and hence that the x-y-position of two or more cells effectively converge, which cannot be distinguished from a convergence of all three co-ordinates due to the fact that the z-position was not recorded. Partial convergence is when the two or more cells can be visually distinguished as separate objects with individually differing x-y-values, despite their partially overlapping.

If there is a collision of cells, the cell co-ordinates are captured (step 30) and stored in a storage medium 31. If a collision exists, it is assumed that a new cluster is present (step 32) and the respective information is stored in another storage medium 33.

If check 27 indicates that the cell at Z is part of a cluster, an examination 34 is performed to determine whether the cluster has split up. To this end, information is exchanged with the storage medium 33 for cluster information. The respective cell co-ordinates are likewise captured in step 30 and stored accordingly in storage medium 31. Step 30 is followed by a check 35 on whether all the cells to be tracked have already been processed. If there are cells that are still unprocessed, counter Z is incremented 36 and the method is continued at step 26. If all the cells have been processed, the method is continued at step 21.

Figure 4:
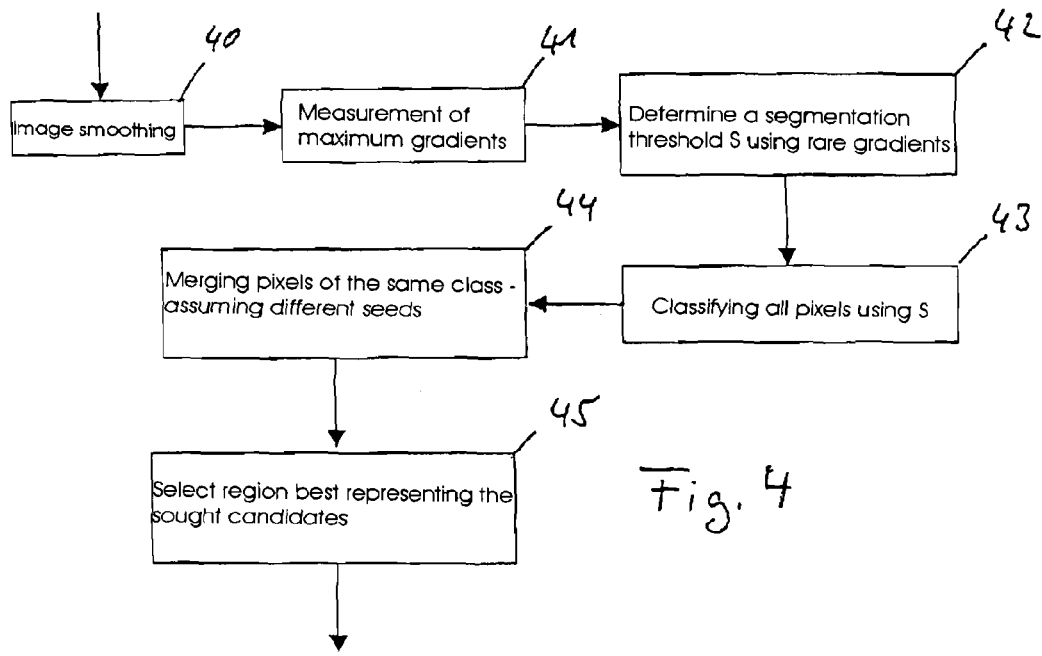
FIG. 4 is a block diagram showing the segmentation method according to the invention.
Figure 5A:
FIG. 5a shows an example of a cell image.

FIG. 4 shows a block diagram illustrating the segmentation method according to the invention. The steps shown here may be included in step 28 in FIG. 3. Image smoothing 40 can be performed, the result of which can be an image as shown in FIG. 5a. FIG. 5a shows an example of a cell image as the result of digitizing a recording from an optical microscope using 256 gray levels.

This is followed by determining 41 a maximum gradient for each pixel of the image as the maximum difference between a pixel value of the pixel and the respective pixel values of all or selected neighboring pixels. The pixel values of the pixel and the neighboring pixels are compared with each other and the greatest difference is assigned to the pixel as a maximum gradient. A segmentation threshold value is then determined using the frequencies of the maximum gradients (step 42). When determining the segmentation threshold value, the most frequent maximum gradients are combined step by step and the number of pixels thus covered is compared to the estimate for the number of pixels belonging to the environment of the cell to be segmented. The threshold value is determined from the number of combined maximum gradients. In the simplest case shown here, the threshold value is identical to the number of combined gradients. Other options are to add or subtract a fixed, predetermined value to the number in order to obtain a threshold value. It is also possible to multiply the number by a predetermined factor, i.e. to enlarge or diminish this factor in order to determine the threshold value.

Figure 5B:
FIG. 5b shows a classification of the image in FIG. 5a, FIG. 5c shows a segmentation of the image in FIG. 5a, with a depiction of a segment outline.

In the following step 43, the pixels are classified into an object class and an environment class using the segmentation threshold value, those pixels whose maximum gradient is equal to or greater than the segmentation threshold value being allocated to the object class and the other pixels being allocated to the environment class. This results in an image as in FIG. 5b, which shows a classification of the image in FIG. 5a as an intermediate stage of a segmentation method according to the invention. It can be recognized that smaller regions of the cell's environment are also counted as belonging to the class of the cell.

Figure 5C:
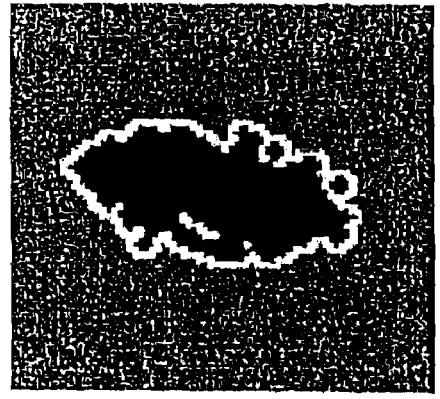
FIG. 5d shows the outline in FIG. 5c image entered in the image from FIG. 5a, FIG. 6 shows a device according to the invention for recording images of biological cells.

Merging 44 of pixels in the same class is subsequently performed beginning with different seeds in order to form a segmented region of the digital image. If a portion of the image is selected, as in FIGS. 5a to 5d, such that the cell is depicted in the middle of this selected section, merging can also commence from the center of the picture. FIG. 5c shows a segmentation of the image in FIG. 5a as the result of merging, and depicts an outline of a segment. By means of a region growing method, contours can be extracted from the pixels counted as belonging to the class of the cell. A homogeneity criterion determines when the region growing method encounters what is to be assumed to be a cell edge. This criteria may be predetermined and may specify, for example, that at most two pixels from the 4-neighborhood of a pixel may belong to a different class. It can be recognized that only one contiguous region represents the cell and that the surrounding region depicts the cell environment. In a final step 45, that region is selected which, on the basis of the previous cell information, best reproduces the cell.

Figure 5D:
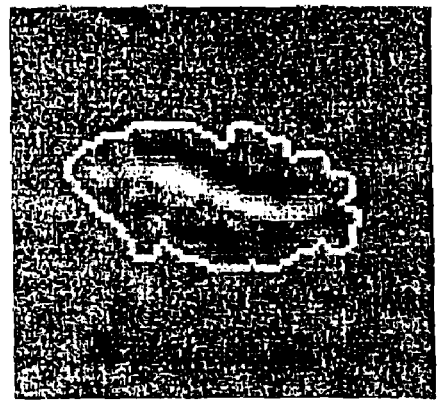

FIG. 5d shows the outline from FIG. 5c entered into the image from FIG. 5a. As can be seen here, the outline determined according to the method of the invention seems to match well the actual outline of the cell. Segmentation was therefore successful.

Figure 6:
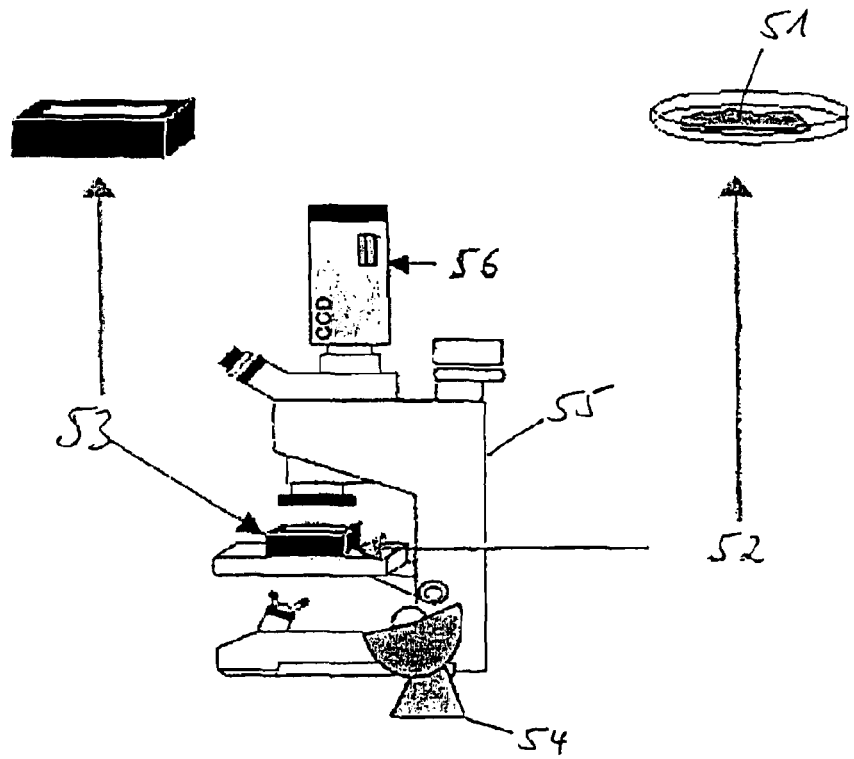

FIG. 6 shows a device according to the invention for recording images of biological cells. The cells to be tracked are located in a collagen matrix, a 3-dimensional structure lying on an object carrier 52, Object carrier 52 is located in an incubator 53, which keeps the sample in a thermally controlled state with the aid of an infrared source 54 or some other heat source. Microscope 55 focuses on a fixed plane of the sample and is no longer changed during the analysis. At fixed intervals, for example every two minutes, a CCD camera 56 takes a picture of the sample. The picture is transferred to a computer (not shown) connected to CCD camera 56 and stored in the computer. The images thus present in the computer can be subjected to segmentation and, after one or more cells have been selected by the user for tracking and visualization of their dynamic behavior, are used to analyze the dynamic behavior. The information thus obtained can be processed in various ways in the computer and made available to the user.

The segmentation method according to the invention also derives from the following example of an algorithm.

1) Generating a histogram of maximum gradients in the image (referred to as Hist)
2) Sorting the histogram in ascending order according to frequencies of the maximum gradients (referred to as SHist)
3) Initializations (smallest possible_value:=0, maximum possible_value:=255; i:=maximum possible_value; counted pixels:=0)
4) As long as (counted pixels<estimated_environment variable) and
   (i>smallest_possible_gradient)
   {
   4.a) i:=i−1
   }
5) threshold:=maximum possible_value−i
6) Marking all the pixels in the image whose maximum gradient>=threshold
7) Performing region growing methods: northeast, southeast, southwest and northwest from the center of the selected image section
8) The largest segment corresponds to the cell being sought.
9) The contour around the segment is determined.

After sorting has been performed in step 2), the "histogram" is no longer a histogram in the real sense. The number of pixels are arranged in ascending order according to the increasing frequency of the respective maximum gradients. Hence, it is not a histogram for gradient sizes, but shows the distribution of the gradient frequencies.

The pixels marked in step 6) result in an approximation for the region occupied by the cell in the image. By means of the region growing method in step 7), these pixels are combined to form a contiguous region. Erroneously selected pixels which lie outside the region (see FIG. 5b) are excluded therefrom.

The region growing method has its starting point in the middle of a section of the picture that is chosen such that the cell is shown in the central part of the section. Selection of this section of the picture is based on the position of the cell in a previous image. By assuming that the cell has not moved far, the computing power and computing time required for segmentation can be further reduced because it is not necessary to process the entire image, but only part of it.

Figure 7G:
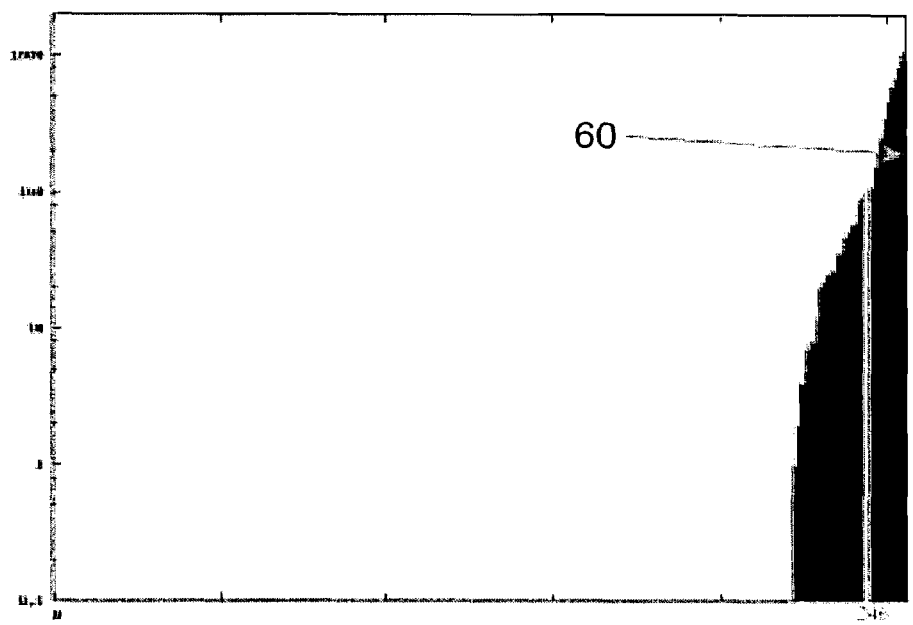
FIG. 7g shows a sorted view of the maximum gradients from FIG. 7d, with ascending frequency.

FIG. 7f shows a gradient histogram resulting from the gradient image of a cell image shown in FIG. 7c. In FIG. 7a, one can see the image of a cell shown in FIG. 7b after smoothing. FIG. 7c shows the gradient sizes for each pixel. In FIG. 7c, the contrast has been increased to improve visualization. The x-axis of the histogram shown in FIG. 7f is scaled from zero to 255, corresponding to the possible differences in gray-scale values of neighboring pixels. The y-axis is logarithmically scaled in order to better depict the variations in frequencies. In the histogram shown in FIG. 7f, there are no maximum gradients with a value of 40 or more. This maximum gradient is therefore assigned a frequency of zero. The first 215 positions in the ascendingly sorted histogram in FIG. 7g are therefore empty.

Commencing with the most frequent gradients, in other words from right to left in FIG. 7g, the pixels associated with the respective gradients are counted until the limit of the estimated environment variable is reached. In FIG. 7g, this is shown by the lightly colored line dividing the most frequent gradients 60 from the rest of the diagram, which collectively represents a number of pixels which lie above the estimated number of environment pixels. SHist[255-247], which is the number of pixels with the 9 most frequent maximum gradients, is even smaller here than the estimated value for the environment variable, whereas SHist[255-246] is already greater than this estimate. It has been found in practice that a good first estimate can be assumed in many cases to be half the number of pixels in the entire image.

Figure 7H:
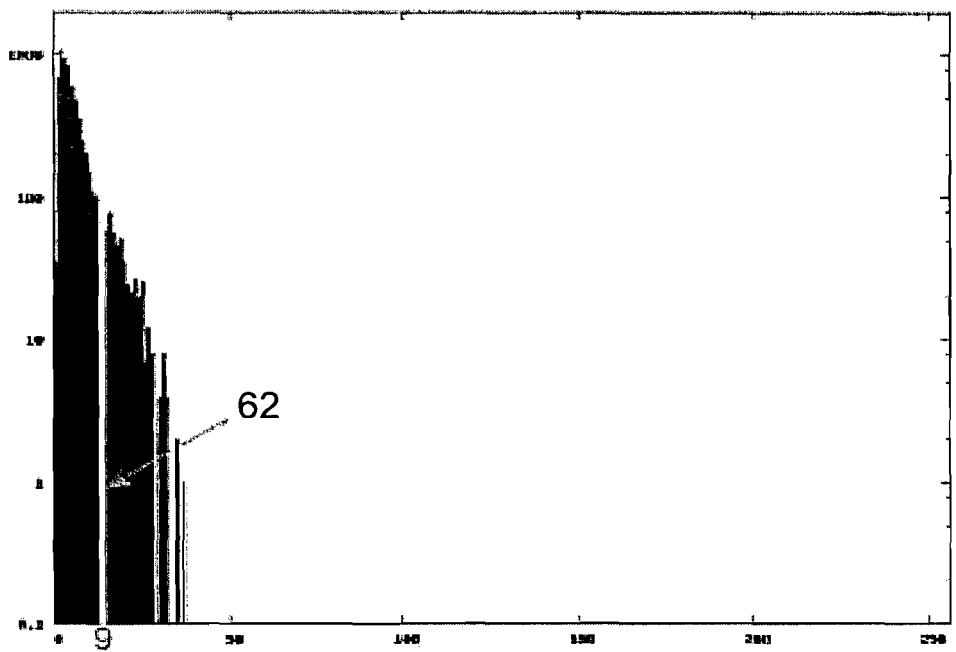
FIG. 7h shows the gradient diagram of FIG. 7f with threshold value entered.
Figure 8A:
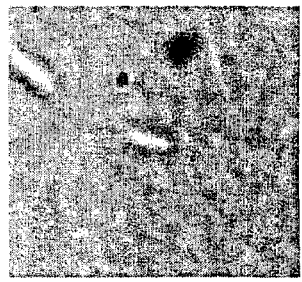
FIGS. 8a to 8e show samples of cell images similar to FIGS. 7a to 7e.
Figure 8B:
Figure 8C:
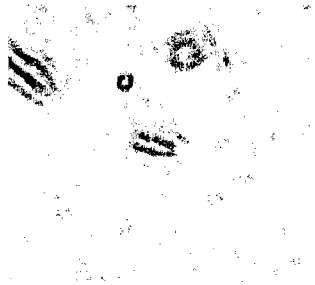
Figure 8D:
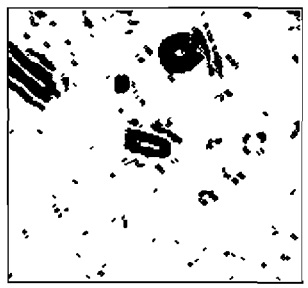
Figure 8E:
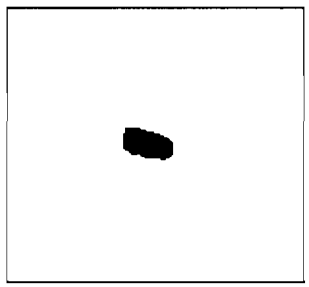
Figure 8F:
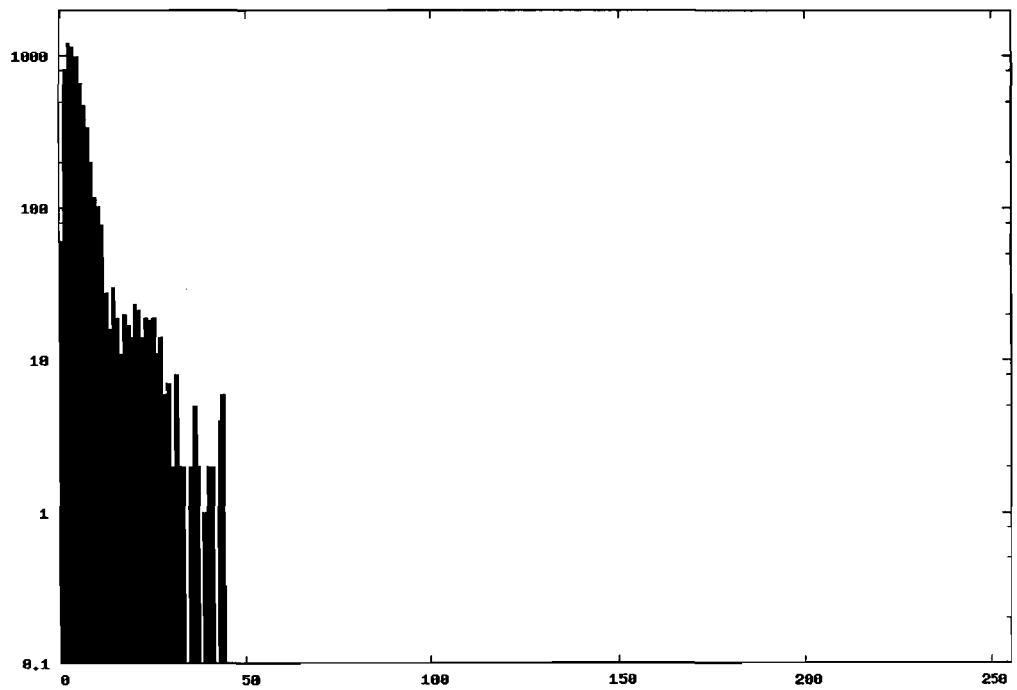
FIG. 8f shows a gradient histogram with the frequencies of the maximum gradients from FIG. 8d
Figure 8G:
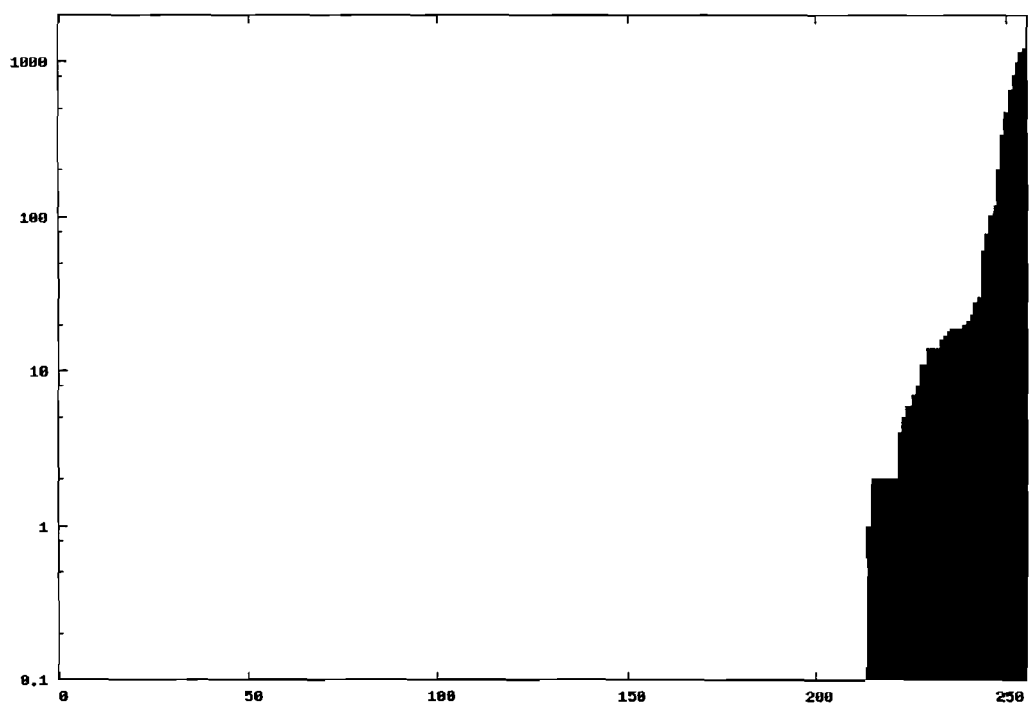
FIG. 8g shows a sorted view of the maximum gradients from FIG. 7d, with ascending frequency.

In FIG. 7h, the threshold value that was determined from the combined number of most frequent maximum gradients has been marked into the gradient histogram from FIG. 7f. AU pixels whose maximum gradient is smaller than threshold value 62, and whose gradients are therefore shown to the left of the threshold value, are assigned to the environment. Those pixels whose gradient is above the threshold, in other words greater than 9 in this case, are assumed to belong to the cell. It can be assumed here that the surrounding pixels have small gradients and that the pixels which depict the cell are more likely to have large gradients. Practical application has shown that, in the case of special image material, the threshold value can be further improved by multiplying the number of repetitions by a factor in a range between 0.5 and 1.5. Applying the threshold value to gradient image 7c results in binarized image 7d, from which the cell area is obtained in an image such as FIG. 7e by merging in all directions from the center of the selected section.

The number of most frequent maximum gradients was assumed here to be the threshold value, but it is possible to deviate from the latter when calculating the threshold value in the predetermined manner. For example, it may be advantageous to assume a higher or a lower threshold value. The threshold value can be calculated by subtracting or adding a fixed value, for example, or by multiplying by a predefined factor. This adjusted threshold value can likewise be passed on as a parameter from one segmentation to the next.

The method according to the invention shall now be illustrated once again with reference to FIGS. 8a to 8g, in a manner analogous to FIGS. 7a to 7h.

The method according to the invention for segmenting a digital image of biological cells is invariant in respect of gray-scale values and form, and can operate with picture material that can be heterogeneously illuminated. It can be performed without tags such as fluorescent markers, or assumptions being made about the shape and color of the cells to be segmented. Such an automated process is what first allows such extensive analyses to be carried out that conclusions with statistical relevance can then be drawn. It is also suitable for detecting biologically relevant characteristics such as color value, cell size and cell shape. In addition to undyed cells, representing the preferred application, it is also possible to detect cells tagged with a fluorescence dye.

In certain circumstances, a simplified variant of the method of the invention can also be deployed. Sorting is dispensed with, an the environment variable is assumed instead to be the number of pixels for which the smallest maximum gradient was determined. The environment variable and the predefined estimate for the number of pixels forming the environment of a biological cell are iteratively compared, and the number of pixels which respectively have the next largest maximum gradient to the environment variable are taken until the environment variable exceeds or reaches the estimate, whereby the segmentation threshold value is determined from the number of times iterative comparison and addition are repeated. For the cell images shown here, the more complex method according to the invention is generally advantageous, whereas it suffices to use the simplified variant when there is suitable image material. In the algorithm described above, steps 2) to 5) are left out and replaced by a loop with the following form:

counted_pixels:=0
As long as (counted_pixels<estimated valued of environment variable)
counted_pixels:=counted_pixels+Hist[i]
i:=i+1

What is advantageous here is that sorting is dispensed with, thus allowing a simplified algorithm and enabling the computing time needed for segmentation to be reduced.

In another configuration of the invention, the number of repetitions is defined by a constant for determining the segmentation threshold value. Depending on the distribution of object and surrounding pixels in a special experiment, a specific value can be defined for this constant. Appropriate ranges can be derived from special data material, and in the case of the examples discussed, values in the range of 5 to 20 are typically obtained. Under favorable conditions, one can make do with a constant threshold that can be varied by a factor depending on the application.

The invention claimed is:

1. A method for segmenting a digital image of biological cells, comprising the steps:
    determining a maximum gradient for each pixel of the digital image as a maximum difference between a pixel value of the pixel and the respective pixel values of all or selected neighboring pixels,
    determining a segmentation threshold value using the maximum gradients, comprising the steps
    a) determining a value of an environment variable as a number of pixels for which a smallest maximum gradient was determined,
    b) iteratively comparing the value of the environment variable and a predefined estimate for a number of pixels depicting the environment of a biological cell, and adding the number of pixels having the next largest maximum gradient to the value of the environment variable until the value of the environment variable exceeds or reaches the estimated value, and
    c) determining the segmentation threshold value from a number of repetitions of step b),
    classifying the pixels into an object class and an environment class using the segmentation threshold value, those pixels whose maximum gradient is equal to or greater than the segmentation threshold value being allocated to the object class, and the other pixels being allocated to the environment class, and
    forming a segmentation zone of the digital image using a class merging method.

2. The method of claim 1, wherein the class merging method is a region growing method.

3. A method for analyzing a dynamic behavior of biological cells using an image data set for a plurality of consecutively produced images of the cells in a region being examined, said method comprising the steps:
    segmenting a first image to determine first cell positions in the first image,
    segmenting a second image to determine second cell positions in the second image,
    correlating the second cell positions with the first cell positions, wherein each said segmenting step is performed using a method according to claim 1.

4. The method according to claim 3 for analyzing dynamic behavior,
    wherein when segmenting the second image, the predefined estimate is determined as an average number of pixels of the segmented regions depicting the cells in the first image.

5. The method according to claim 3 for analyzing dynamic behavior,
wherein the second cell positions are correlated with the first cell positions on a basis of at least one cell property from the group of total luminosity, proximity, size and shape.

6. A method for visualizing a dynamic behavior of biological cells using an image data set for a plurality of consecutively produced images of the cells in a region being examined, said method comprising the steps:
recording a temporal sequence of digital images,
segmenting a starting image,
selecting one or more cells to be examined,
analyzing the dynamic behavior of the cells to be examined and
processing information obtained from the analysis, wherein
said segmenting step is performed using a method according to claim 1, and said analyzing step is performed using a method according to claim 3.

7. The method of claim 6 for visualizing the dynamic behavior of biological cells,
wherein when analyzing the dynamic behavior of the cells the second cell positions are correlated with the first cell positions based on a direction of movement and/or speed associated with cell positions.

* * * * *

UNITED STATES PATENT AND TRADEMARK OFFICE
CERTIFICATE OF CORRECTION

PATENT NO. : 8,200,013 B2  Page 1 of 1
APPLICATION NO. : 13/211751
DATED : June 12, 2012
INVENTOR(S) : Otthein Herzog et al.

It is certified that error appears in the above-identified patent and that said Letters Patent is hereby corrected as shown below:

In the Specification:

Column 7, line 60, after words "carrier 52", change "," to -- . --;

Column 8, line 22, after "{" insert: -- 4.a) counted_pixels:=counted_pixels + SHist[i] --;

Column 8, line 23, change "4.a)i:=i-1" to -- 4.b)i:=i-1 --;

Column 9, line 16, after words "from FIG. 7f.", change "AU" to -- All --.

Signed and Sealed this
Twenty-eighth Day of August, 2012

David J. Kappos
*Director of the United States Patent and Trademark Office*